United States Patent [19]
Badesha et al.

[11] Patent Number: 5,830,939
[45] Date of Patent: Nov. 3, 1998

[54] VISCOSITY REDUCTION METHOD

[75] Inventors: Santokh S. Badesha, Pittsford; Robert M. Ferguson, Penfield, both of N.Y.; Marko D. Saban; Sonja Hadzidedic, both of Etobicoke, Canada; Arnold W. Henry, Pittsford; George J. Heeks, Rochester, both of N.Y.; Nam S. Ro; John Abate, both of Mississauga, Canada

[73] Assignee: Xerox Corporation, Stamford, Conn.

[21] Appl. No.: 637,914

[22] Filed: Apr. 25, 1996

[51] Int. Cl.$^6$ .............. C08K 5/05; C08K 5/101; C08L 83/08; B01J 13/00
[52] U.S. Cl. .............. 524/379; 252/314; 524/315; 524/389; 524/506; 524/916
[58] Field of Search .............. 252/314; 524/363, 524/364, 805, 916, 506, 315, 379, 389

[56] References Cited

U.S. PATENT DOCUMENTS

| | | | |
|---|---|---|---|
| 2,581,454 | 1/1952 | Sprung | 524/364 X |
| 2,686,767 | 8/1954 | Green | 524/364 |
| 2,940,874 | 6/1960 | Barnes | 524/364 X |
| 3,904,575 | 9/1975 | Satokawa et al. | 524/363 X |
| 4,029,527 | 6/1977 | Imperial et al. | 427/22 |
| 4,101,686 | 7/1978 | Strella et al. | 427/22 |
| 4,257,699 | 3/1981 | Lentz | 355/3 FU |
| 4,264,181 | 4/1981 | Lentz et al. | 355/3 FU |
| 4,272,179 | 6/1981 | Seanor | 355/3 FU |
| 4,764,560 | 8/1988 | Mitchell | 524/506 |
| 5,395,725 | 3/1995 | Bluett et al. | 430/124 |

*Primary Examiner*—Richard D. Lovering
*Attorney, Agent, or Firm*—Zosan S. Soong

[57] ABSTRACT

There is disclosed a viscosity reduction method including: (a) forming an azeotropic mixture including water and a liquid capable of forming the azeotropic mixture with the water in a coating composition comprised of the water, a solvent, and a polymeric material selected from the group consisting of a fluorohydrocarbon polymer and a grafted elastomer composed of a polyorganosiloxane bonded to a fluoroelastomer; and (b) agitating the coating composition including the azeotropic mixture, thereby reducing the viscosity of the coating composition.

9 Claims, No Drawings

VISCOSITY REDUCTION METHOD

BACKGROUND OF THE INVENTION

This invention relates to a method of reducing the viscosity of a coating composition to a coatable dispersion, particularly where the coating composition has an initially high viscosity.

It has been observed that the standard coating composition containing the volume grafted elastomer, described in Badesha et al., U.S. Pat. No. 5,166,031, the disclosure of which is totally incorporated by reference, exhibits increasing viscosity over time which at some point renders the coating composition unsuitable for easy application to a substrate such as by spray coating. This standard coating composition is used for example in preparing the outer layer of a fuser subsystem component. The coating composition exhibiting the undesirably high viscosity is typically discarded which is economically wasteful and environmentally unfriendly. Thus, there is a need, which the present invention addresses, for a method to reduce the viscosity of a coating composition having undesirably high viscosity, thereby avoiding the economically wasteful and environmentally unfriendly disposal of the viscous material.

Attention is directed to the following documents:

Santokh S. Badesha et al., U.S. Ser. No. 08/637,912 concurrently filed with the present application, titled "Coating Composition With Stable Viscosity," the disclosure of which is hereby totally incorporated by reference, discloses a coating composition comprising water, a solvent, a grafted elastomer composed of a polyorganosiloxane bonded to a fluoroelastomer, and a liquid which forms an azeotropic mixture with the water, wherein the azeotropic mixture of the water and the liquid restrains a viscosity increase in the coating composition over time.

Timothy J. Fuller et al., U.S. Pat. No. 5,501,881 titled "Coated Fuser Member Processes." discloses a process for preparing a fuser member involving applying to a fuser supporting substrate a coating mixture of a fluoropolymer, and an aliphatic alcohol, wherein the presence of the aliphatic alcohol increases the pot life of the coating mixture;

Seanor, U.S. Pat. No. 4,272,179 was relied upon by the Examiner in an obviousness rejection in the above discussed Fuller et al., U.S. Ser. No. 08/347,667, now U.S. Pat. No. 5,501,881;

Bluett et al., U.S. Pat. No. 5,395,725;

Imperial et al., U.S. Pat. No. 4,029,827;

Strella et al., U.S. Pat. No. 4,101,686;

Lentz, U.S. Pat. No. 4,257,699; and

Lentz et al., U.S. Pat. No. 4,264,181.

SUMMARY OF THE INVENTION

The present invention is accomplished in embodiments by providing a viscosity reduction method comprising:

(a) forming an azeotropic mixture including water and a liquid capable of forming the azeotropic mixture with the water in a coating composition comprised of the water, a solvent, and a polymeric material selected from the group consisting of a fluorohydrocarbon polymer and a grafted elastomer composed of a polyorganosiloxane bonded to a fluoroelastomer; and (b) agitating the coating composition including the azeotropic mixture, thereby reducing the viscosity of the coating composition.

DETAILED DESCRIPTION

By the phrase volume graft or volume grafted elastomer, it is intended to define a substantially uniform integral interpenetrating network of a hybrid composition, wherein both the structure and the composition of the fluoroelastomer and polyorganosiloxane are substantially uniform when taken through different slices of the fuser subsystem component.

The phrase interpenetrating network is intended to define the addition polymerization matrix where the fluoroelastomer and polyorganosiloxane polymer strands are intertwined in one another.

The term hybrid composition is intended to define a volume grafted composition which is comprised of fluoroelastomer and polyorganosiloxane blocks randomly arranged.

The coating composition to be subjected to the present invention may have a high viscosity such as at least about 90 seconds, preferably ranging from at least about 100 seconds to a gel, the viscosity being determined by a Gardco viscosity cup, EZ Cup #1, described herein. The term gel indicates that the viscosity of the coating composition is so high that it is beyond the limits of measurement by the Gardco EZ Cup #1 and that the coating composition is no longer free flowing., In embodiments, the present invention includes the breaking open of a gelled coating composition (also referred herein as reversing the gelling) to result in a coatable dispersion. Conventionally, the gel can be broken and viscosity can be lowered by the shear mechanical forces of a blender. However, the use of shear mechanical forces alone will break the gelled material into smaller gel chunks but the resulting broken gel will be unusable for solution coating methods (e.g., spray, flow, and draw coating methods). In contrast, the present invention breaks open the gelled coating composition without producing gel chunks, thereby resulting in a coatable dispersion. The present invention is believed to remove the moisture which may be the cause of gelling; agitation may be needed to get the azeotrope forming liquid to the water.

Within a suitable viscosity range, the coating composition described herein may be used for example in the preparation of the outer layer of a fuser subsystem component, preferably the fuser member. The coating composition may be applied to a substrate by spray coating, flow coating, dip coating, and the like. The fuser subsystem component may be a roll, belt, flat surface or other suitable shape used in the fixing of thermoplastic toner images to a suitable substrate. It may take the form of a fuser member, a pressure member or a release agent donor member, preferably in the form of a cylindrical roll. Typically, the fuser subsystem component is made of a hollow cylindrical metal core, such as copper, aluminum, steel and the like, and has an outer layer of the selected cured elastomer. Alternatively, there may be one or more intermediate layers between the substrate and the outer layer of the cured elastomer if desired. The fuser subsystem component is primarily discussed in the context of a fuser member, but the present invention is applicable to fabrication of the pressure member and the release agent donor member.

The volume grafting is performed in two steps, the first involves the dehydrofluorination of the fluoroelastomer preferably using an amine. During this step hydrofluoric acid is eliminated which generates unsaturation, carbon to carbon double bonds, on the fluoroelastomer. The second step is the free radical peroxide induced addition polymerization of the alkene or alkyne terminated polyorganosiloxane with the carbon to carbon double bonds of the fluoroelastomer.

Fluoroelastomer examples include those described in detail in Lentz, U.S. Pat. No. 4,257,699, as well as those described in Eddy et al., U.S. Pat. No. 5,017,432 and Ferguson et al., U.S. Pat. No. 5,061,965, the disclosures of which are totally incorporated by reference. As described therein these fluoroelastomers, particularly from the class of copolymers and terpolymers of vinylidenefluoride hexafluoropropylene and tetrafluoroethylene, are known commercially under various designations as VITON A™, VITON E™, VITON E60C™, VITON E430™, VITON 910™, VITON GH™ and VITON GF™. The VITON™ designation is a Trademark of E.I. Dupont deNemours, Inc. Other commercially available materials include FLUOREL 2170™, FLUOREL 2174™, FLUOREL 2176™, FLUOREL 2177™ and FLUOREL LVS 76™, FLUOREL™ being a Trademark of 3M Company. Additional commercially available materials include AFLAS™ a poly (propylene-tetrafluoroethylene), FLUOREL II™ (LII900) a poly(propylene-tetrafluoroethylene-vinylidenefluoride) both also available from 3M Company as well as the TECNOFLON™ compositions identified as FOR-60KIR, FOR-LHF, NM, FOR-THF, FOR-TFS, TH, TN505 available from Montedison Specialty Chemical Co. Typically, these fluoroelastomers are cured with a nucleophilic addition curing system, such as a bisphenol crosslinking agent with an organophosphonium salt accelerator as described in further detail in the above referenced Lentz Patent and in U.S. Pat. No. 5,017,432. In a particularly preferred embodiment, the fluoroelastomer is one having a relatively low quantity of vinylidenefluoride, such as in VITON GF™, available from E.I. Dupont deNemours, Inc. The VITON GF$^{FM}$ has 35 weight percent vinylidenefluoride, 34 weight percent hexafluoropropylene and 29 weight percent tetrafluoroethylene with 2 weight percent cure site monomer. It is generally cured with bisphenol phosphonium salt, or a conventional aliphatic peroxide curing agent.

Preferred examples of the polyorganosiloxane having functionality according to the present invention are of the formula:

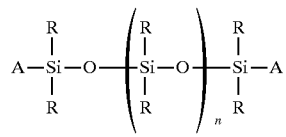

where R independently is an alkyl having for example from 1 to 24 carbon atoms, and preferably from 1 to 12 carbon atoms; alkenyl having for example from 2 to 24 carbon atoms, and preferably from 1 to 12 carbon atoms; or aryl having for example from 6 to 24 carbon atoms, and preferably from 6 to 18 carbon atoms, wherein the aryl group is optionally substituted with an amino, hydroxy, mercapto or an alkyl having for example from 1 to 24 carbon atoms, and preferably from 1 to 12 carbon atoms, or alkenyl group having from 2 to 24 carbon atoms, and preferably from 2 to 12 carbon atoms. In preferred embodiments, R is independently selected from methyl, ethyl, and phenyl. The functional group A may be an alkene or alkyne group having for example from 2 to 8 carbon atoms, preferably from 2 to 4 carbon atoms, optionally substituted with an alkyl having for example from 1 to 24 carbon atoms, and preferably from 1 to 12 carbon atoms, or aryl group having for example from 6 to 24 carbon atoms, and preferably from 6 to 18 carbon atoms. Functional group A can also be mono-, di-, or trialkoxysilane having 1 to 10, preferably 1 to 6, carbon atoms in each alkoxy group,. hydroxy, or halogen. Preferred alkoxy groups include methoxy, ethoxy, and the like. Preferred halogens include chlorine, bromine-and fluorine. In the above formula, n represents the number of segments and may be for example 2 to 350, and preferably from about 5 to about 100. In the above formula, typical R groups include methyl, ethyl, propyl, octyl, vinyl, allylic crotonyl, phenyl, naphthyl and phenanthryl and typical substituted aryl groups are substituted in the ortho, meta and para positions with lower alkyl groups having less than 15 carbon atoms, and preferably from 1 to 10 carbon atoms. In a preferred embodiment, n is between 60 and 80. Typical alkene and alkenyl functional groups include vinyl, acrylic, crotonic and acetenyl which may typically be substituted with methyl, propyl, butyl, benzyl, and tolyl groups, and the like. The polyorganosiloxane may be present in any effective amount in the grafted elastomer, preferably from about 5 to about 50% by weight, and more preferably from about 10 to about 25% by weight based on the weight of the grafted elastomer. The polyorganosiloxane in the grafted elastomer differs from the formula disclosed herein for the functionally terminated polyorganosiloxane reactant, since the functional ends may have undergone reactions to bond the polyorganosiloxane to the fluoroelastomer.

The dehydrofluorinating agent which attacks the fluoroelastomer generating unsaturation is selected from the group of strong nucleophilic agents such as peroxides, hydrides, bases, oxides, etc. The preferred agents are selected from the group consisting of primary, secondary and tertiary, aliphatic and aromatic amines, where the aliphatic and aromatic groups have from 2 to 15 carbon atoms. It also includes aliphatic and aromatic diamines and triamines having from 2 to 15 carbon atoms where the aromatic groups may be benzene, toluene, naphthalene or anthracene etc. It is generally preferred for the aromatic diamines and triamines that the aromatic group be substituted in the ortho, meta and para positions. Typical substituents include lower alkylamino groups such as ethylamino, propylamino and butylamino with propylamino being preferred. Specific amine dehydrofluorinating agents include N-(2 aminoethyl-3-aminopropyl)-trimethoxy silane, 3-(N-strylmethyl-2-aminoethylamino) propyltrimethoxy silane hydrochloride and (aminoethylamino methyl) phenethyltrimethoxy silane.

Other adjuvants and fillers may be incorporated in the elastomer as long as they do not affect the integrity of the fluoroelastomer. Such fillers normally encountered in the compounding of elastomers include coloring agents, reinforcing fillers, crosslinking agents, processing aids, accelerators and polymerization initiators. Following coating of the fluoroelastomer on the substrate, it is subjected to a step curing process at about 38° C. for 2 hours followed by 4 hours at 77° C. and 2 hours at 177° C.

The dehydrofluorinating agent generates double bonds by dehydrofluorination of the fluoroelastomer compound so that when the unsaturated functionally terminated polyorganosiloxane is added with the initiator, the polymerization of the siloxane is initiated. Typical free radical polymerization initiators for this purpose are benzoyl peroxide and azoisobutyronitrile, AIBN.

The substrate for the fuser subsystem component may be of any suitable material. Typically, it takes the form of a cylindrical tube of aluminum, steel or certain plastic materials chosen to maintain rigidity, structural integrity, as well as being capable of having the elastomer coated thereon and adhered firmly thereto. Typically, the fuser members may be made by injection, compression or transfer molding, or they may be extruded. In a typical procedure the core which may be a steel cylinder is degreased with a solvent and cleaned with an abrasive cleaner prior to being primed with a primer such as Dow Corning 1200 which may be sprayed, brushed or dipped followed by air drying under ambient conditions for thirty minutes and then baked at 150° C. for 30 minutes. A silicone elastomer intermediate layer may be applied according to conventional techniques such as injection molding and casting after which it is cured for up to 15 minutes and at 120to 180 degrees Centigrade to provide a complete cure without a significant post cure operation. This curing operation should be substantially complete to prevent debonding of the silicone elastomer from the core when it is removed from the mold. Thereafter the surface of the silicone elastomer is sanded to remove the mold release agent and it is wiped clean with a solvent such as isopropyl alcohol to remove all debris.

The outer layer of the fuser member is preferably prepared by dissolving the fluoroelastomer in a typical solvent, such as methyl ethyl ketone, methyl isobutyl ketone and the like, followed by stirring for 15 to 60 minutes at 45°–85° C. after which the polymerization initiator which is generally dissolved in an aromatic solvent, such as toluene is added with continued stirring for 5 to 25 minutes. Subsequently, the polyorganosiloxane is added with stirring for 30 minutes to 10 hours at a temperature of 45°–85° C. A nucleophilic curing agent such as, Viton Curative No. 50, which incorporates an accelerator, (a quarternary phosphonium salt or salts) and a crosslinking agent, bisphenol AF in a single curative system is added in a 3 to 7 percent solution predissolved in the fluoroelastomer compound. Optimally, the basic oxides, MgO and Ca(OH)$_2$ can be added in particulate form to the solution mixture. Providing the layer on the fuser member substrate is most conveniently carried out by spraying, dipping or the like a solution of the homogeneous suspension of the fluoroelastomer and polyorganosiloxane to a level of film of about 12.5 to about 125 micrometers in thickness. This thickness range is selected as providing a layer thin enough to prevent a large thermal barrier for fusing and thick enough to allow a reasonable wear life. While molding, extruding and wrapping techniques are alternative means which may be used, spraying successive applications of the solvent solution is preferred. When the desired thickness of coating is obtained, the coating is cured and thereby bonded to the roll surface. A typical step curing process is heating for two hours at 93° C. followed by 2 hours at 149° C. followed by 2 hours at 177° C. followed by 2 hours at 208° C. and 16 hours at 232° C. In an alternative procedure, the solvent maybe removed by evaporation by known means, the residue rinsed with a hydrocarbon solvent such as hexane to remove unwanted reactants, if any, and the residue redissolved in the original solvent followed by the addition of Curative No. 50 and the subsequent formation of the outer layer.

The amount of the polymeric material, whether the fluorohydrocarbon polymer or the grafted elastomer, in the coating composition may range for example from about 10 to about 50% by weight, preferably from about 20 to about 40% by weight, based on the weight of the coating composition prior to the addition of the liquid.

In embodiments of the present invention, the polymeric material may be a fluorohydrocarbon polymer including the fluoroelastomers described herein. A coating composition containing the fluorohydrocarbon polymer may be prepared as follows. VITON GF™ (60 g) and methyl isobutyl ketone (197.8 g) are stirred at ambient temperature (25° C.) using a Union Process O1 attritor containing ⅜ inch steel shot (2,500 g) for 30 minutes to form a polymer solution. The attritor is externally cooled with a water jacket to maintain the solution temperature at ambient temperature. Without external cooling, the temperature of the solution in the attritor can rise to 33 C. A mixture of magnesium hydroxide (Merck and Company, MAGLITE D™, 1.2 g, 0.407 weight percent), calcium hydroxide (Baker reagent grade, 0.6 g, 0.203 weight percent), copper oxide (American Chemet 13600, 9 g, 3.05 weight percent), and VITON CURATIVE 50™ (DuPont, 3 g, 1.02 weight percent) are added and stirring is continued for 15 more minutes. The resultant mixture is then filtered through ⅛ inch coarse nylon filter cloth.

The liquid may be any suitable medium which forms an azeotropic mixture with water such as an aliphatic alcohol, an aromatic hydrocarbon, a nitrile, an ether, an acid, or an acetate including combinations of two, three or more liquids as long as such combinations still form azeotropic mixtures with the water. These liquids are mentioned in Sections D-12 for "Binary" and D-24 to D-27 for "Temary Systems" in the CRC. Handbook of Chemistry and Physics, 69th Edition (1988–1989), edited by R. C. Weast, the disclosure of which is totally incorporated by reference. Where combinations of liquids are employed, the various liquids may be employed in any effective proportion ranging for instance from 10:90 to 90:10 by volume for two liquids. Examples of an aliphatic alcohol include those with from about 1 to about 25 carbon atoms, and preferably from 1 to 6 carbon atoms like methanol, ethanol, propanol, butanol, pentanol, trifluoroethanol. Examples of an aromatic hydrocarbon include benzene, toluene, and xylene. Examples of a nitrile include acetonitrile, acrylonitrile, and isobutronitrile: Examples of an ether include ethyl vinyl ether, tetrahydrofuran, and butyl ether. Examples of an acid include acetic acid, propionic acid, and valeric acid. Examples of an acetate include methyl acetate, ethyl acetate, and isopropyl acetate.

The liquid may be added to the coating composition in an amount ranging for example from about 1 to about 20% by weight, preferably from about 2 to about 10% by weight, and more preferably from about 3 to about 5% by weight, based on the weight of the coating composition including the liquid.

Water may be present as for example moisture in an amount ranging for instance from about 1 to about 5% by weight, and especially from about 1 to about 3% by weight, based on weight of the coating composition prior to the addition of the liquid.

The solvent may be a ketone such as methyl ethyl ketone or methyl isobutyl ketone. The solvent may be present in an amount ranging for example from about 1% to about 60% by weight, preferably from about 5% to about 30%, based on the weight of the coating composition prior to the addition of the liquid.

The coating composition may be agitated for instance for at least about 5 hours, preferably from about 12 hours to about 15 days, and preferably from about 4 to about 12 days. Agitation may be accomplished by for example shaking the vessel containing the coating composition, stirring the coating composition with a stirring device such as a rod, or both. The coating composition may be shaken at a rate ranging for example from about 50 to about 200 oscillations per minute, and preferably from about 100 to about 150 oscillations per minute.

It is believed that the viscosity of the coating composition containing the polymeric material increases due to the moisture (i.e., water) present in the reaction solvents (e.g., methylethyl ketone and methyl isobutyl ketone). Because of the presence of the unsaturation (i.e., carbon carbon double bonds) in the polymeric material, it is believed that water starts associating through presumably hydrogen bonding with the fluorine and/or double bonds of the polymeric material resulting in the viscosity increase. If the reaction is allowed to continue, this results in the formation of the gel. According to the present invention, removal of the water from the coating composition in the sense of binding the water through an azeotrope mixture formation along with agitation results in the reduction of the viscosity, thereby rendering the coating composition to be coatable.

In embodiments, the present invention reduces the viscosity of the coating composition from above 100 seconds to a viscosity level associated with a coatable dispersion (applied for example by spray coating) such as from about 50 to about 80 seconds, and preferably from about 53 to about 70 seconds, and especially about 55 seconds as determined by a Gardco viscosity cup, EZ Cup#1, described herein. The amount of the viscosity decrease according to the present invention may range for example from about 30 to about 90 seconds, and preferably from about 50 to about 70 seconds as determined by a Gardco viscosity cup, EZ Cup#1, described herein. The viscosity measurements described herein are made at 23° C.

The present disclosure including the examples uses the following viscosity cups which are commonly used means for measuring viscosity: Gardco cups made by Paul Gardner Company, Inc., Gardner building, 316 N.E. 1st St., Pompano Beach, Fla. 33060. The Gardco cups are simple, rugged and relatively low cost with the accuracy that is adequate for our measurements. The "dip" type is used. The dip type is placed in the test material and as it is withdrawn the time for the material to drain from the cup is determined. The orifice is part of the cup body. There are five types of Gardner EZ Cups: from EZ#1 to EZ#5. They cover the Centistoke range from 7.5 to 1388 in 5% steps. Stoke is one of the fundamental units of viscosity. The Centistoke is Stoke divided by 100. The result of the EZ Cup measurement is obtained as an efflux time in seconds using the stopwatch. The efflux time in seconds ("T") can be converted into the centistokes ("V") using the formula (1), according to the Paul Gardner Company:

$$V = KT - C/T \quad (1)$$

where K and C. are constants. For example, the values of the constants for EZ Cup#1 are K=0.875 and C=993; for other Cup#'s the values of the constants are different. For instance for EZ Cup#1: 39.9 seconds translates into 10.0 centistokes, and 61.4 seconds translates into 37.5 centistokes. The examples, however, do not use the conversion formula but report the viscosity results in EZ Cup#1 seconds.

The invention will now be described in detail with respect to specific preferred embodiments thereof, it being understood that these examples are intended to be illustrative only and the invention is not intended to be limited to the materials, conditions, or process parameters recited herein. All percentages and parts are by weight unless otherwise indicated. The phrase room temperature or ambient temperature refers to a temperature of about 25° C. In the Examples below, the coating compositions were shaken at a rate of about 100 to about 110 oscillations per minute.

EXAMPLE 1

The coating composition containing the grafted elastomer was prepared by dissolving 21.45 kg of Viton GF pellets in a mixture of 222.0 kg of methylethyl ketone (MEK) and 51.6 kg of methyl isobutyl ketone (MIBK) by stirring at room temperature. This was accomplished by using a 100 gallon stainless steel reactor. The reactor was equipped with a water condenser and with a jacket for heating. The dissolution step was done under 5 standard cubic foot per hour (SCFH) of nitrogen purge through the water condenser. The Viton GF pellets were added over 2 hours and the dissolution was carried out for an additional 6 hours after the end of the Viton GF addition. The mixing (at 200 RPM) was then turned off and the solution was left in the reactor under nitrogen blanket over night. The following day, 6.435 kg of polydimethyl siloxane vinyl terminated (PS441) available from United Chemical Technologies, Inc. followed by a 3.9 kg MIBK rinse was added to the above solution at room temperature and the solution was heated up to 70° C. under 200 RPM mixing speed. Next, 429.0 g of N-2-aminoethyl-3-aminopropyltrimethyoxysilane (AO700), available from United Chemical Technologies, Inc. in 3.0 kg of MIBK was added to the reactor, followed by 3.9 kg of MIBK rinse. About 5 minutes later, 536.4 g of 98% benzoyl peroxide (BPO) available from Queen City Distributors, in 7.8 kg of MIBK was added to reactor, followed by 3.9 kg of MIBK rinse. This was taken as time zero for the reaction. The stirring was continued for 2 hours at 70° C. During this time the color of solution turned dark yellow which then was cooled down to 50° C. and discharged into two 55 gallon metal drums. The EZ Cup#1 viscosity of the fresh sample was typically between about 40 and about 60 seconds which is acceptable for downstream processing such as spray coating. However, the viscosity of the sample increased to above 100 seconds upon storage at ambient temperature for 2 to 4 weeks, which rendered the coating composition unsuitable for further processing such as by spray coating onto a substrate. A portion (estimated to be about 151.8 grams) of the weight of the added MEK and MIBK was water.

EXAMPLE 1-1

To 450 g of aged solution prepared in Example 1, with EZ Cup#1 of 107.6 seconds, 50 grams of methanol (10% wt) was added in a clean 1-L plastic bottle and the bottle was tightly capped. Bottle was placed on a laboratory shaker (made by Eberbach Corporation, Ann Arbor, Mich., distributed by Fisher Scientific). Viscosity of the solution was measured as shown in Table 1:

| EZ Cup#1 (seconds) @23° C. | Time On Shaker (days) |
| --- | --- |
| 107.6 | 0 |
| 55.1 | 1 |
| 56.3 | 4 |
| 52.7 | 5 |
| 54.0 | 6 |
| 53.3 | 12 |

The 10% wt methanol addition was effective in reducing the viscosity of the solution to within the preferred spray coating range of about 40 to about 60 seconds.

EXAMPLE 1- 2

To 475 g of aged solution prepared in Example 1, with EZ Cup#1 of 111.5 seconds, 25 grams of methanol (5% wt) was added in a clean 1-L plastic bottle and the bottle was tightly capped. Bottle was placed on the laboratory shaker. Viscosity of the solution was reduced to 56.2 seconds after 17 hours and to 55.2 seconds after 34 hours on the shaker. The 5% wt methanol addition was therefore effective in reducing viscosity of the solution to within the preferred spray coating range of about 40 to about 60 seconds.

EXAMPLE 1-3

To 475 g of aged solution prepared in Example 1, with EZ Cup#1 of 111.5 seconds, 25 grams of isopropyl alcohol (5% wt) was added in a clean 1-L plastic bottle and the bottle was tightly capped. Bottle was placed on the laboratory shaker. Viscosity of the solution was reduced to 63.6 seconds after 17 hours and to 62.4 seconds after 34 hours on the shaker. Thus, the 5% wt isopropyl alcohol addition was effective in reducing the solution viscosity but not as much as the MeOH addition. Higher level of isopropyl alcohol addition may bring the viscosity to within the preferred spray coating range of about 40 to about 60 seconds.

EXAMPLE 1-4

To 475 g of aged solution prepared in Example 1, with EZ Cup#1 of 111.5 seconds, 25 grams of toluene (5% wt) was added in a clean 1 -L plastic bottle and the bottle was tightly -capped. Bottle was placed on the laboratory shaker. Viscosity of the solution was reduced to 70.2 seconds after 17 hours and to 68.7 seconds after 34 hours on the shaker. Thus, the 5% wt toluene addition was effective in reducing the solution viscosity but not as much as the MeOH addition. Higher level of toluene addition may bring the viscosity to within the preferred spray coating range of about 40 to about 60 seconds.

EXAMPLE 1-5

To 475 g of aged solution prepared in Example 1, with EZ Cup#1 of 111.5 seconds, 25 grams of ethyl acetate (5% wt) was added in a clean 1-L plastic bottle and the bottle was tightly capped. Bottle was placed on the laboratory shaker. Viscosity of the solution was reduced to 76.5 seconds after 17 hours and to 72.9 seconds after 34 hours on the shaker. Thus, the 5% wt ethyl acetate addition was effective in reducing the solution viscosity but not as much as the MeOH addition. Higher level of ethyl acetate addition may bring the viscosity to within the preferred spray coating range of about 40 to about 60 seconds.

EXAMPLE 1-6

To 475 g of aged solution prepared in Example 1, with EZ Cup#1 of 111.5 seconds, 25 grams of MEK (5% wt) was added in a clean 1-L plastic bottle and the bottle was tightly capped. Bottle was placed on the laboratory shaker. Viscosity of the solution was reduced to 70.6 seconds after 17 hours and to 78.2 seconds after 34 hours on the shaker. Thus, the 5% wt MEK addition was effective in reducing the solution viscosity but not as much as the MeOH addition. Higher level of MEK addition may bring the viscosity to within the preferred spray coating range of about 40 to about 60 seconds.

EXAMPLE 1-7

To 450 g of aged solution prepared in Example 1, which has undergone gelling, 50 g of methanol (10% wt) was added in a clean 1-L plastic bottle. The EZ Cup#1 could not measure the viscosity of the gelled solution due to its high viscosity. Bottle was placed on the laboratory shaker. Viscosity of the solution was measured as shown in Table 2:

| EZ Cup#1 (seconds) @23° C. | Time On Shaker (days) |
| --- | --- |
| gel | 0 |
| 124.4 | 1 |
| 75.3 | 4 |
| 57.3 | 5 |
| 55.7 | 6 |
| 57.6 | 12 |

The 10% wt methanol addition was effective in breaking up the gel without any gel chunks and reduced the viscosity of the solution to within the preferred spray coating range of about 40 to about 60 seconds.

COMPARATIVE EXAMPLE 1

About 486 g of aged solution prepared in Example 1, with EZ Cup#1 of 111.5 seconds was added in a clean 1 -L plastic bottle and the bottle was tightly capped. Bottle was placed on the laboratory shaker. Viscosity of the solution was reduced to 83.8 seconds after 17 hours and to 84.6 seconds after 34 hours on the shaker. Thus, as compared with the above examples, shaking alone fails to reduce the viscosity of the coating composition to the level reached by the addition of the liquid forming the azeotropic mixture with the water in combination with the agitation.

Other modifications of the present invention may occur to those skilled in the art based upon a reading of the present disclosure and these modifications are intended to be included within the scope of the present invention.

We claim:

1. A viscosity reduction method comprising:
   (a) forming an azeotropic mixture including water and a liquid capable of forming the azeotropic mixture with the water in a coating composition comprised of the water, a solvent, and a polymeric material wherein the polymeric material is a grafted elastomer composed of a polyorganosiloxane bonded to a fluoroelastomer; and
   (b) agitating the coating composition including the azeotropic mixture, thereby reducing the viscosity of the coating composition.

2. The method of claim 1, wherein (a) includes adding the liquid to the coating composition in an amount ranging from about 1 to about 20% by weight based on the weight of the coating composition including the liquid.

3. The method of claim 1, wherein (a) includes adding the liquid to the coating composition in an amount ranging from about 2 to about 10% by weight based on the weight of the coating composition including the liquid.

4. The method of claim 1, wherein (a) includes adding the liquid to the coating composition in an amount ranging from about 3 to about 5% by weight based on the weight of the coating composition including the liquid.

5. The method of claim 1, wherein (a) includes adding the liquid to the coating composition wherein the liquid is an aliphatic alcohol.

6. The method of claim 1, wherein (a) includes adding the liquid to the coating composition wherein the liquid is methanol.

7. The method of claim 1, wherein (a) includes adding the liquid to the coating composition wherein the liquid is selected from the group consisting of an aromatic hydrocarbon, a nitrile, an ether, an acid, and an acetate.

8. The method of claim 1, wherein (b) includes agitating the coating composition for at least about 5 hours.

9. The method of claim 1, wherein the coating composition prior to (a) is a gel.

* * * * *